US005601004A

United States Patent [19]

Queen

[11] Patent Number: 5,601,004

[45] Date of Patent: Feb. 11, 1997

[54] TIRE CUTTING APPARATUS

[76] Inventor: David A. Queen, 2972 G Rd., Grand Junction, Colo. 81504

[21] Appl. No.: 311,177

[22] Filed: Sep. 23, 1994

[51] Int. Cl.[6] .......... B23B 5/14

[52] U.S. Cl. .......... 82/54; 82/56; 82/58; 82/101; 83/951

[58] Field of Search .......... 82/53, 54, 56, 82/57, 58, 83, 101; 83/923, 951; 241/DIG. 31; 157/31

[56] References Cited

U.S. PATENT DOCUMENTS 3,701,296 10/1972 Snow .......... 82/54
4,134,316 1/1979 Bullinger .......... 82/101 X
5,054,351 10/1991 Jolliffe et al. .......... 83/951 X
5,235,888 8/1993 Dom .......... 83/951 X

*Primary Examiner*—S. Thomas Hughes
*Attorney, Agent, or Firm*—Donald W. Erickson

[57] ABSTRACT

A tire cutting apparatus for severing the tread portion from the sidewall portion of a tire. The severed tread is cut transversely so that it can be extended and placed flat down and used to form a wall, fence or the like. The apparatus includes cutting wheels and roller receivers which are in vertical alignment therewith. Between the cutting wheels is a driver roller which causes the tire carcass to rotate around the roller receivers. A cutter blade is provided to transversely cut the tread portion. The cut is made at the juncture of the tread portion and the upper sidewall portion.

2 Claims, 4 Drawing Sheets

TIRE CUTTING APPARATUS

BACKGROUND OF THE INVENTION

This invention relates to a tire cutting apparatus for separating the tread portion and sidewall portion of a tire. The cut by the apparatus is such that the tread portion lies flat after it is cut transversely. The disposal of millions of trade in tires or used tires annually is a huge problem. The seriousness and magnitude of the disposal problem is such that the new tire purchaser or consumer must pay the tire dealer a certain sum such as $1.50 to $3.00 per tire to accept the used tires being replaced. The dealer, in turn, is required to pay a disposal site operator such as a landfill operator a certain sum to accept the used tires for disposal. Typical prior art patents relating to tire cutting machines are Dom, U.S. Pat. No. 5,235,888, issued Aug. 17, 1993, Booker et al., U.S. Pat. No. 5,147,163, issued Sep. 15, 1992, and Jolliffe et al., U.S. Pat. No. 5,054,351, issued Oct. 8, 1991. Typical prior art patents relating to the use of tire treads and tire sidewalls are Tripp, U.S. Pat. No. 5,285,616, issued Feb. 15, 1994, Chiovitti, U.S. Pat. No. 5,284,326, issued Feb. 8, 1994, and Halliburton, U.S. Pat. No. 5,236,756, issued Aug. 17, 1993.

SUMMARY OF THE INVENTION

A tire cutting apparatus having means for cleanly and efficiently separating the tread portion and sidewall portion of tires of various sizes. The tire cutting apparatus of the present invention also includes means for transversely cutting the separated tread portion. The severed tread portion can be extended and placed flat down in successive layers to form a fence, wall or the like. For aesthetics, a coating such as stucco or plaster can be applied to the stacked tread portions. The sidewall portion can be used beneficially as described by Halliburton, U.S. Pat. No. 5,236,756, and other uses.

The tire cutting apparatus of the present invention severs the tread portion from the sidewall portion of the tire precisely at the juncture of the base of the tread and the upper part of the sidewall. The apparatus includes means for adjusting the cutting means in order to accommodate tires of various diameters and widths.

DETAILED DESCRIPTION OF THE INVENTION

Figure 1:
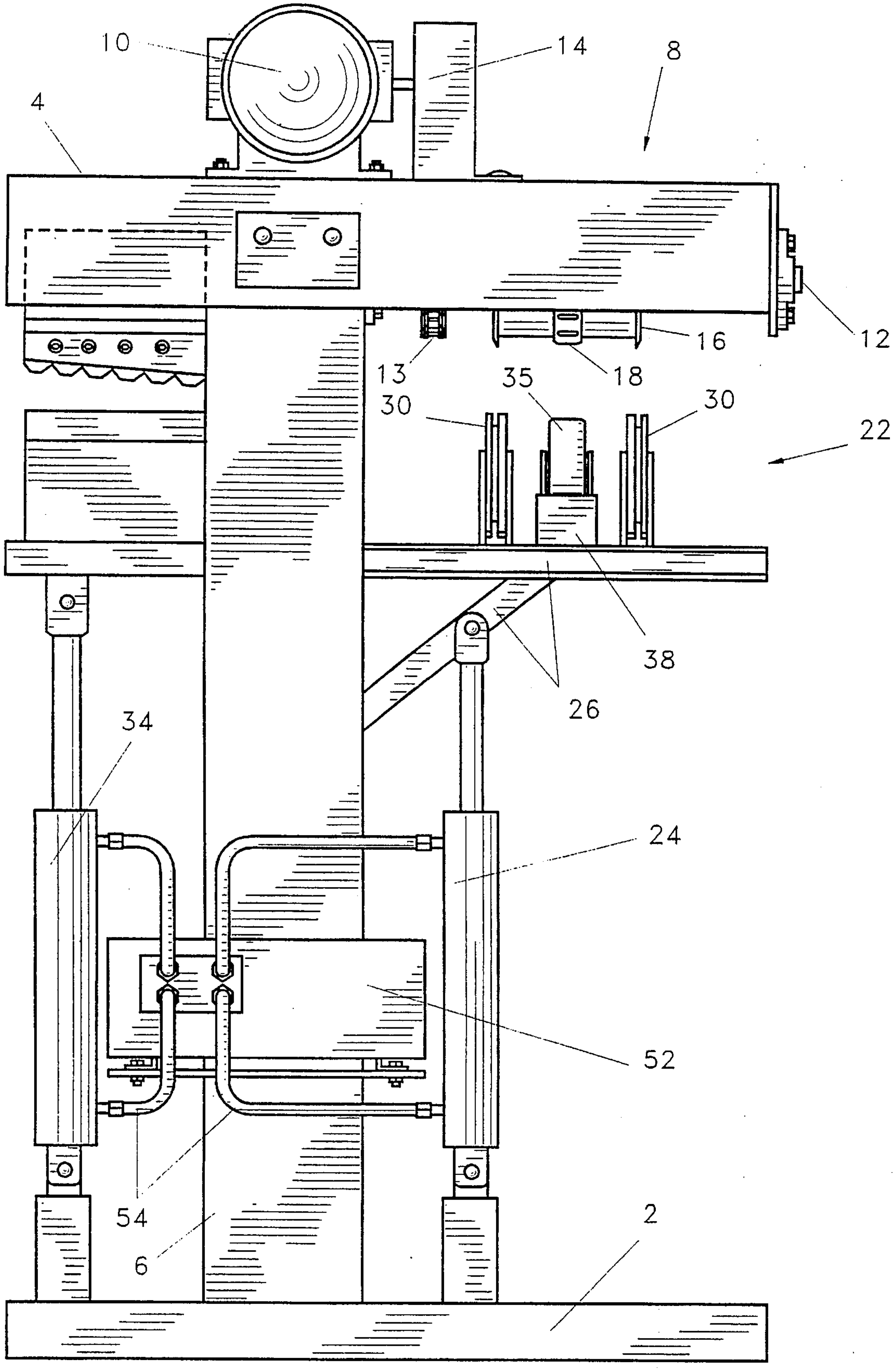
FIG. 1 is a front elevational view of a tire cutting apparatus in accordance with the present invention.
Figure 2:
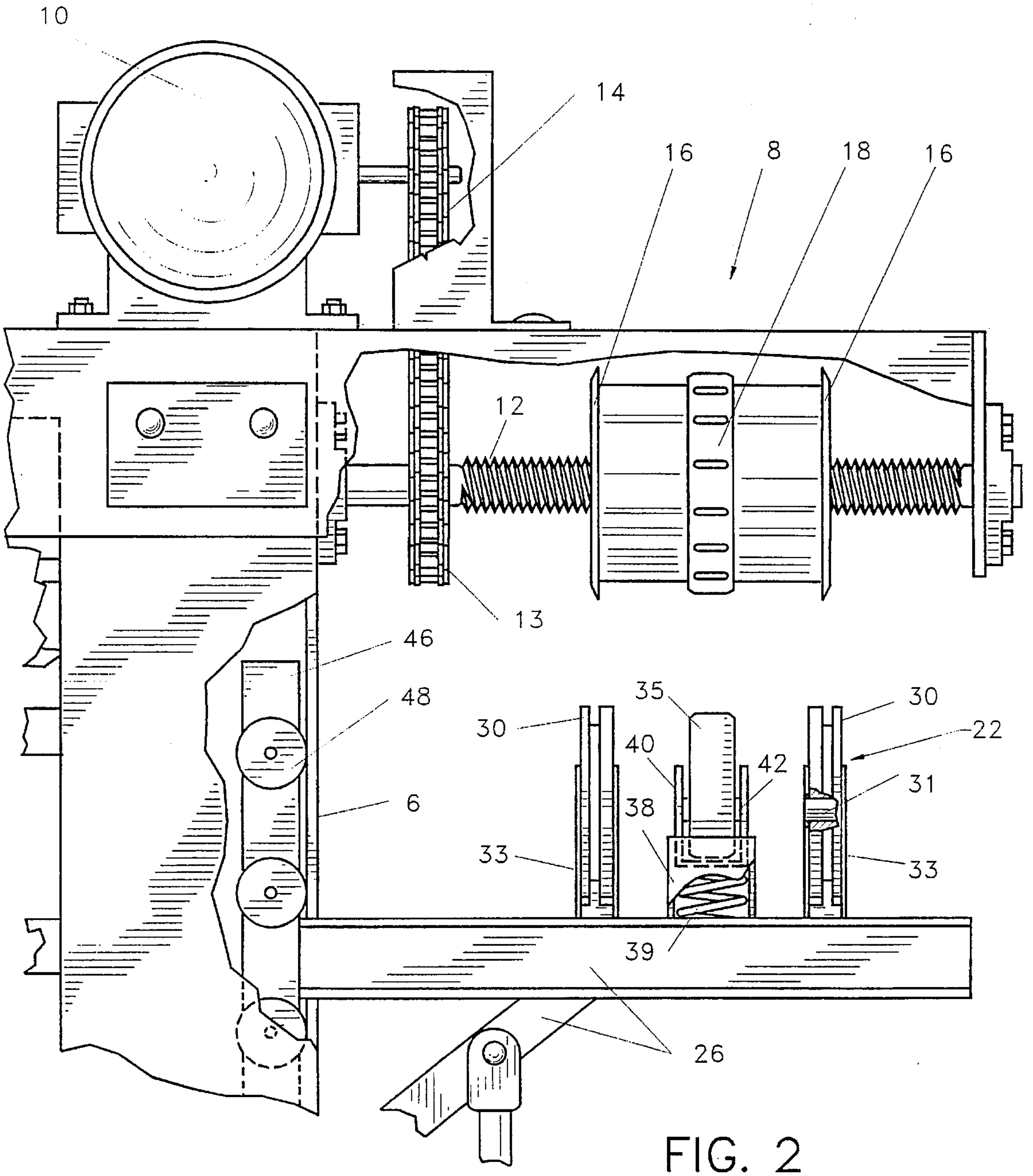
FIG. 2 is an enlarged, cutaway, front elevational view of the cutter assembly and roller table assembly of FIG. 1.
Figure 3:
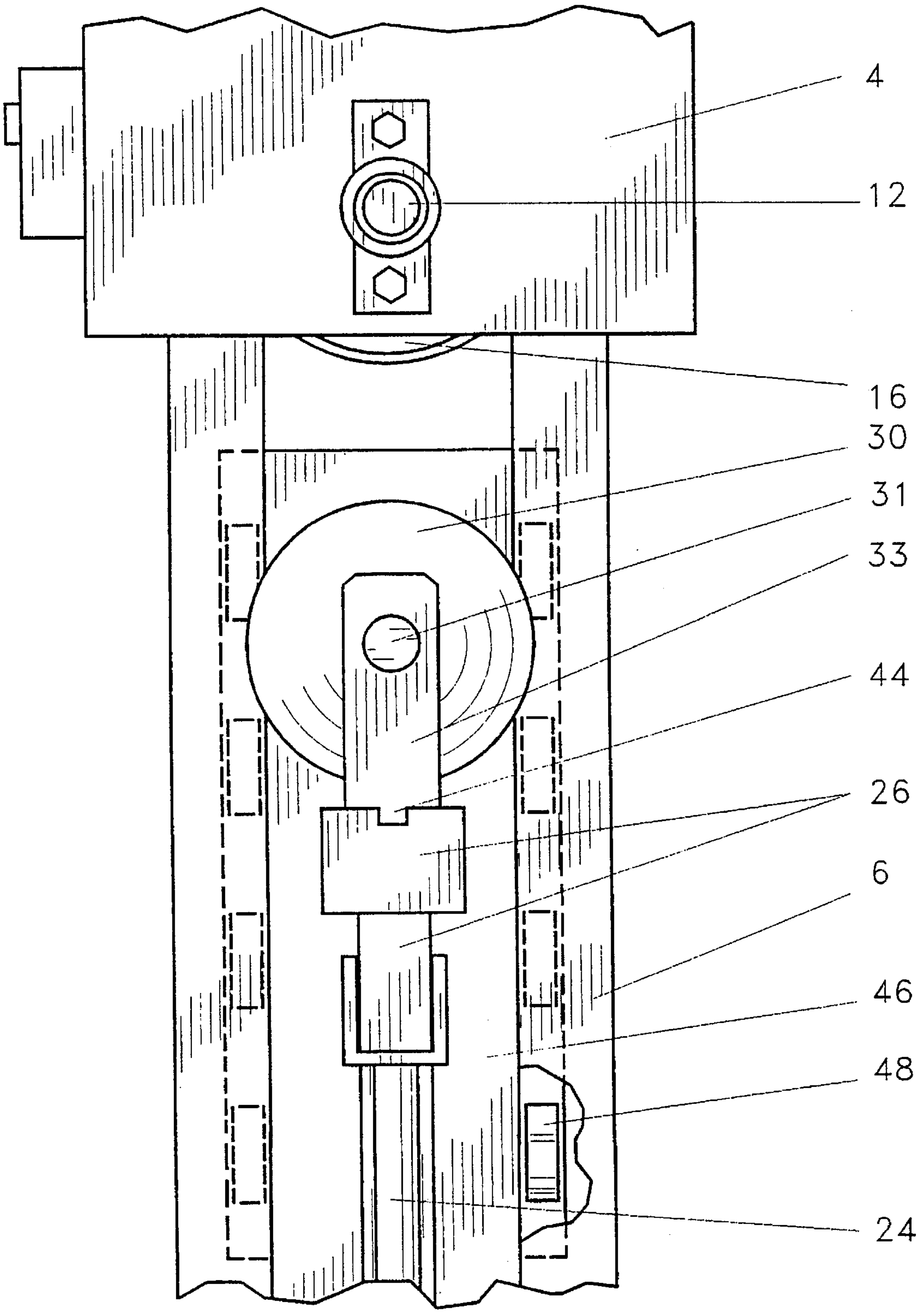
FIG. 3 is a partial, elevational end view, right side of FIG. 1.

With reference to FIG. 1, there is shown a front elevational view of a tire cutting apparatus of the present invention. The apparatus includes a framework comprising generally rectangular shaped lower and upper supporting platforms 2 and 4 with upright, supporting posts 6 disposed therebetween and joined thereto. The framework is suitably made of angle iron and/or channel iron of about 3 or 4 inches. Positioned within and supported by the upper platform 4 is an electrically powered cutter assembly means 8 comprising an electric motor 10, threaded shaft 12 having a keyway, a sprocket chain 14 to drive gear 13 on shaft 12 (gear reduction of about 50 to 1), two laterally adjustable spaced apart cutting wheels 16 affixed, e.g., by set screws or lock bolts, to the keyway of shaft 12, and driver roller 18. Preferably, the driver 18 has a knurled or serrated peripheral surface to facilitate gripping and turning of the tire carcass. The driver 18 is laterally adjustable also so that it can be generally centered between cutters 16. Suitably the motor is about 2 horsepower and operates on 110 voltage. The shaft 12 can be about 1¼ inch iron with a keyway of about ¼ inch. The cutting wheels 16 can be about 4 to 6 inches or larger in diameter and made of a high quality hardened steel. A high quality steel for the cutting wheel is recommended because many of today's tires are steel belted. The driver 18 should be made of a good quality steel also. It can be of varying thickness such as about 2 to 4 inches or more.

Positioned below the cutter assembly is a vertically adjustable roller table assembly 22. The roller table assembly is slidably mounted on posts 6 to provide for up and down movement thereof. In the embodiment shown, the table assembly 22 is moved up and down in response to the pneumatic hydraulic ram 24 which is affixed at the lower end to platform 2 and at its upper end to generally triangular support member 26. Mounted on member 26 are two adjustable roller cutter blade receivers 30 which have a cutter blade receptive groove in the periphery thereof. The receivers 30 are spaced so that the groove therein is in vertical alignment with the cutting edge of cutting blades 16. The receivers 30 are rotatably mounted on shafts 31 which are supported by upright members 33. Positioned at about midpoint between roller receivers 30 is a spring loaded pressure roller 35 which bears against the interior surface of the tire tread. It is in vertical alignment with drive roller 18 and insures positive engagement of driver 18 with the outer surface of the tire tread. Pressure on roller 35 is provided by coil spring 39 positioned within housing 38. The spring slidably engages upright members 40, at the base thereof, which in turn supports shaft 42. Upright members 40 are vertically slidable relative to housing 38. Pressure roller 35 and receivers 30 are laterally adjustable along support member 26 in groove 44 and secured in the desired position with a set screw or lock nuts. Roller assembly 22 is vertically slidable within posts 6 in response to ram 24 via support member 46 provided with roller bearings 48. Support member 26 is affixed to member 46 as by welding or bolting.

Figure 4:
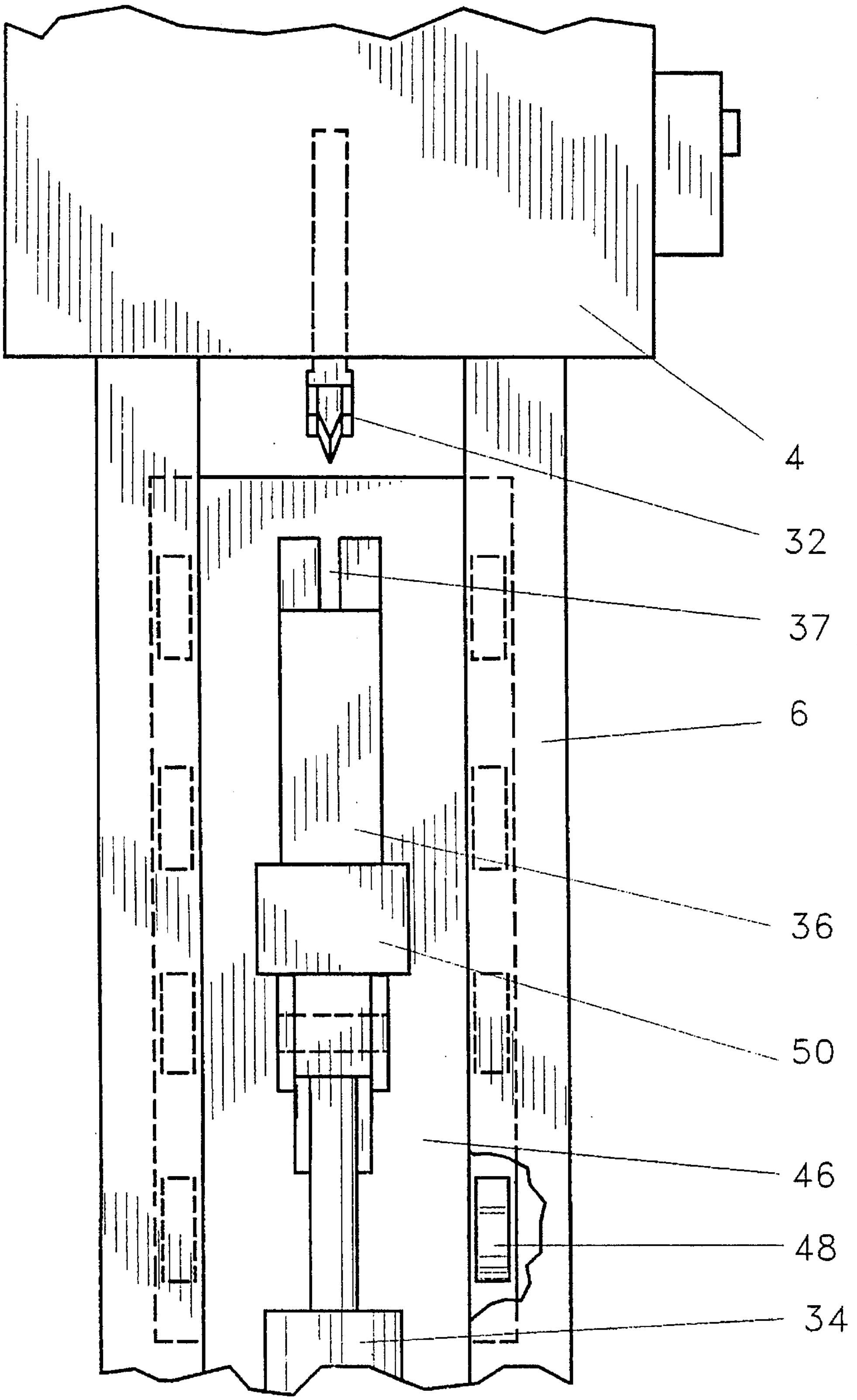
FIG. 4 is a partial, elevational end view, left side of FIG. 1.

With reference to FIGS. 1 and 4, the cutting blade 32 is affixed to support member 4 as by bolting, and cutting blade receiver 36 is affixed to support member 50. Receiver 36 is provided with a groove 37 adapted to receive the cutting edge of blade 32 as the tire tread is. cut transversely. Support member 50 slidably moves up and down in a channel of posts 6 in response to the action of ram 34. Rams 34 and 24 are powered by motor 52 via hydraulic lines 54. To separate the tire tread portion and sidewall portion, the tire is placed on receivers 30, ram 24 activated to press the tire against driver 18, roller 35 and cutting blades 16, and electric motor 10 turned on. The tire rotates and the tread and sidewall are severed. The severed tread portion. is then placed around receiver 36, pneumatic hydraulic ram 34 activated to press the tread against cutting blade 32 to transversely cut the tread. The resulting severed tread can then be extended and placed flat down for use in making walls, fences and other uses. The sidewalls can be shredded for use as fuel or other uses.

What is claimed is:

1. A tire cutting apparatus for severing the tread portion and sidewall portions of a tire carcass at the juncture of the base of the tread portion and upper sidewall of the tire which comprises:

a frame including an upper platform and a lower platform with channeled vertical posts positioned therebetween at about midpoint of said platforms;

electrically powered cutting assembly means mounted in said upper platform including two laterally adjustable cutting wheels and a driver roller spaced between said cutting wheels, said powered cutting assembly means causing turning of the tire and severing of the tread portion and sidewall portions of the tire; and roller receiver table means vertically slidable on said vertical posts, said roller receiver table means including two laterally adjustable roller receivers which are in vertical alignment with said cutting wheels and a laterally adjustable pressure roller spaced between said roller receivers and in vertical alignment with said driver roller, said pressure roller being adapted to engage the inner surface of the tread portion of the tire and to cause positive engagement of the tire tread with said driver roller, said roller receiver table means being adapted to receive a tire carcass.

2. The tire cutting apparatus of claim 1 which includes a cutter blade adapted to cut a tire tread transversely, said cutter blade being mounted in said upper platform and a cutting blade receiver vertically slidable on said posts, said blade receiver being in vertical alignment with said cutter blade and adapted to receive and support a tire tread and to press the tread against the cutter blade.

* * * * *